(12) United States Patent
Morris et al.

(10) Patent No.: US 7,757,854 B2
(45) Date of Patent: Jul. 20, 2010

(54) PROTECTIVE CARRIER FOR FRAGILE ARTICLES

(75) Inventors: James K. Morris, Quincy, MA (US); Ricardo Salinas, San Francisco, CA (US); Mourad Chaouch, Melrose, MA (US)

(73) Assignee: Blueskylab, LLC, Quincy, MA (US)

( * ) Notice: Subject to any disclaimer, the term of this patent is extended or adjusted under 35 U.S.C. 154(b) by 0 days.

(21) Appl. No.: 12/183,208

(22) Filed: Jul. 31, 2008

(65) Prior Publication Data

US 2009/0032429 A1  Feb. 5, 2009

Related U.S. Application Data

(60) Provisional application No. 60/953,485, filed on Aug. 2, 2007.

(51) Int. Cl.
*B65D 81/02* (2006.01)
*B65D 85/00* (2006.01)

(52) U.S. Cl. ............... 206/522; 206/521; 206/523; 206/521.2

(58) Field of Classification Search ........... 206/522, 206/521, 523, 521.2
See application file for complete search history.

(56) References Cited

U.S. PATENT DOCUMENTS

| | | | |
|---|---|---|---|
| 2,729,259 A | 3/1956 | Abrams | |
| 4,100,860 A | 7/1978 | Gablin et al. | |
| 4,574,953 A * | 3/1986 | Garbuzov | 206/522 |
| 4,705,085 A | 11/1987 | Brown | |
| 5,135,132 A | 8/1992 | Potochnik | |
| 5,402,892 A | 4/1995 | Jaszai | |
| 5,564,570 A * | 10/1996 | Jaszai | 206/523 |
| 5,624,035 A | 4/1997 | Kim | |
| D388,663 S | 1/1998 | Rausch | |
| 5,845,806 A | 12/1998 | Parchman | |
| 6,918,231 B2 * | 7/2005 | Scalise | 53/416 |
| 2004/0079670 A1 * | 4/2004 | Sendijarevic et al. | 206/523 |
| 2006/0042996 A1 * | 3/2006 | Picot et al. | 206/586 |

\* cited by examiner

*Primary Examiner*—J. Gregory Pickett
*Assistant Examiner*—Blaine G Neway
(74) *Attorney, Agent, or Firm*—John N. Bain (57) ABSTRACT

A unitary, reusable, deformable protective normally flat body spatially conformable to an object to define a protective carrier including a hollow case or body member defining a continuous, uninterrupted cavity, the cavity being filled with a preferably unitary preformed open-celled bat extending throughout the cavity, the body defining a central portion and opposed side portions contiguous thereto and a pair of opposed end portions defining cavities coextensive with the other cavities, unitary operative valve means for introducing air into and withdrawing air from all cavities, the central and opposed side portions being deformable to wrap around an article and the respective end portions being deformable to fold over the engaged side portions when enclosing an article, the valve means being accessible when the article is fully wrapped with the body member.

7 Claims, 6 Drawing Sheets

PROTECTIVE CARRIER FOR FRAGILE ARTICLES

This application claims priority to Provisional Application Ser. No. 60/953,485 filed Aug. 2, 2007, incorporated by reference herein in its entirety.

BACKGROUND OF INVENTION

The invention relates to protective carriers for fragile articles generally and specifically to a protective, foldable, normally substantially flat, planar carrier body member covered with a substantially inelastic, air-impermeable sheet material defining a continuous, interior cavity filled with an air-permeable, resiliently compressible material exhibiting shape memory. The carrier body is bendable and foldable out of its normal flat plane in any direction simultaneously to completely surround articles of differing shapes. The carrier body is provided with means for detachably retaining the carrier in its wrapping configuration around an article. The embodiments shown and described herein are particularly suitable to protect a, fragile liquid-bearing container such as a wine bottle.

Protective covers for fragile articles, including bottles, are well-known in the art. Many of these are designed for transporting various items such as luggage, electronic equipment, sports equipment and other articles which are either fragile or easily broken or damaged if not protected. Various carrying cases, either with rigid or flexible outer shells, have a pad in some or all of the interior to prevent items in the case from shifting and breaking. Those with rigid outer shells or frames inhibit the effects of direct impact by providing strong outer structural support. These cases are principally used for shipping when the article is committed to handling other than by the owner as, for example, by some common carrier including air, rail and truck. Examples of these types of containers are shown in U.S. Pat. No. 5,624,035 ('035) and U.S. Pat. No. 5,402,892 ('892). These patents each disclose a carrying case having a plurality of hollow chambers; each including inserts to inhibit movement of articles within the carrying case. Inserts may be rigid or soft and shaped to hold a particular item, such as a computer and may also divide the interior into various different-sized cavities. Rigid inserts are generally not desirable because the do not always conform to the shape of the contained article and allow it to move during impact. They also transmit vibration which in some instances is undesirable.

Soft inserts have other drawbacks. They may not provide sufficient structural rigidity to the transport case as a whole. Cases with soft inserts can often crush. Soft inserts often are not secured to the interior of the case, permitting enclosed items to move about within the transport case and suffer damage.

U.S. Pat. No. '035 sought to attenuate problems arising from the use of soft, foam inserts by creating a blank defining six (6), individual, rectangular, hollow panels each filled with foam. Means are also provided for air-inflating the cavities containing the foam. These panels individually are attached to a thin backing layer of material coextensive with the shape of the blank defined by the panels, retaining them in their intended relative positions. Since the panels are structurally independent of each other and the back of each is attached to the backing layer, crease channels are generated at the intersections of the respective panels. These channels provide for folding of the backing layer without obstruction from the thickness of the panels to create a rectangular case having a conforming interior cavity. This is as shown in FIG. 2 of U.S. Pat. No. '035. The respective panels can be inflated individually or the panels can be interconnected with air conduits so that air introduced into the cavity of one panel will pass to and inflate all the others.

U.S. Pat. No. '892 discloses an impact-resistant wrapping system for packing fragile articles which comprises a sheet formed by sealing under pressure, two single or multi-layer laminated flexible membranes having gas or air barrier properties with cushioning-cellular material such as sponge foam confined in a single airtight cavity defined between the membranes. The wrapping system is normally flat and the cushioning-cellular material is compressed in the cavity. In construction, the elastic cushion material is normally placed in its compressed flat state in the cavity between the flexible membranes. This results in a thin sheet and a vacuum inside of the cavity. In use, the sheet-like wrapping membrane is wound or folded around the article and retained in its wrapping state with fastening members. Then, in order to produce cushioning protection, air is introduced into the cavity by opening an air valve or puncturing the surface of the wrapping system so as to admit air at ambient pressure to permit expansion of the cushioning-cellular material thereby expanding the continuous inner surface of the membrane against the article.

U.S. Pat. No. 2,729,259 ('259) shows an inflatable, generally cylindrical bladder open at both ends conforming to the shape of a baby bottle. The baby bottle is inserted into the widest open end of the bladder, nipple first, when the bladder is deflated. Valve means are provided to inflate the bladder after the bottle is inserted with the nipple projecting outside of the smaller or narrow, neck-end of the bladder.

Similar inflatable beverage insulator is shown and described in U.S. Pat. Nos. 4,705,085, 5,845,806 and 5,135,132.

SUMMARY OF INVENTION

The particular embodiment of the present invention shown and described herein is particularly useful for hand-carrying a fragile article but is also useable for shipping by air, rail or road. Nevertheless, the principal of this invention are applicable to protecting such items as computers and other electronic devices, radios, audio-visual components, recorders and the like which are not fabricated of glass.

The embodiment of this invention shown and described herein is particularly well-suited to carry a fragile, bottle of wine or other beverage. A protective carrier for transporting such a bottle should be impact-resistant not only on the sides of the bottle but also at the narrowed neck and the flat bottom, easily applied to the bottle, easily carried in one hand, easily wrapped and unwrapped, and when not in use, preferably normally assumes a flat configuration. It must be inexpensive to manufacture and, preferably, be re-usable including easily cleaned.

The protective carrier of this invention normally assumes a flat configuration both before and after use. Directions for it use can be stenciled on the inside or bottle-engaging surface during manufacture and be readily visible to the user as the bottle is being wrapped. The flat configuration provides for the machine application of advertising or other decorations on what becomes the outside of the protective carrier when wrapping an article, such as the name of the recipient or giver, a salutation, corporate advertising or other decorations. This makes the carrying case an ideal present or premium item.

In the preferred embodiment, whether for a bottle or other item, the carrier consists of a pair of space-apart, cover sheets or layers, sealed together at their peripheral edges and defining an internal cavity which cavity is continuous or uninterrupted with no walls or connecting air conduits. The outer cover layers are substantially inelastic and fabricated of an air-impermeable material, preferably water resistant. The internal cavity is substantially filled with a preformed, air-permeable, resilient, memory-retaining foam bat. Preferably, the foam bat is unitary, continuous and of uniform thickness throughout and adhered to the outer cover sheets over the entire contacting surfaces except at the edges of the bat where the cover layers are sealed together.

The cavity defined by the carrier is provided with operative valve means for the introduction and withdrawal of air from the cavity. The valve means is preferably manually operable.

BRIEF DESCRIPTION OF DRAWINGS

The objects and advantages referenced above can be achieved by the invention described and claimed herein one embodiment of which is shown in the drawings and is useful in carrying, generally cylindrically-shaped fragile articles such as a bottle in which:

DETAILED DESCRIPTION OF THE INVENTION

Figure 4:
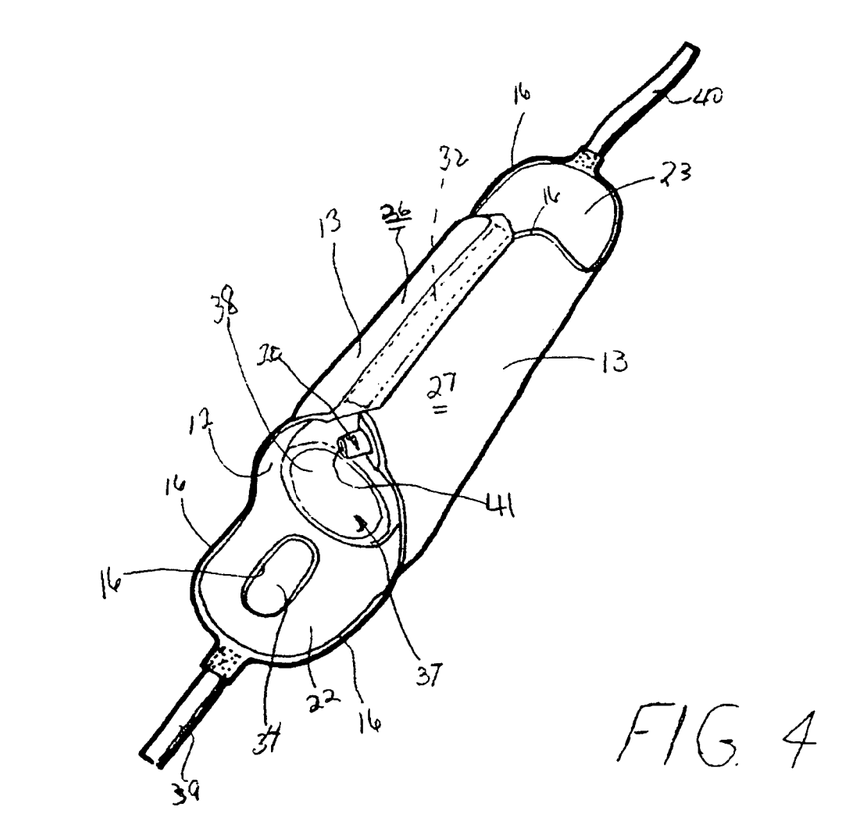
FIG. 4 is a view in perspective as shown in FIG. 3 with the side portions of the blank wrapped around the bottle with a hook and loop fastener strip, referred to hereafter as "Velcro®" edging engaged.
Figure 5:
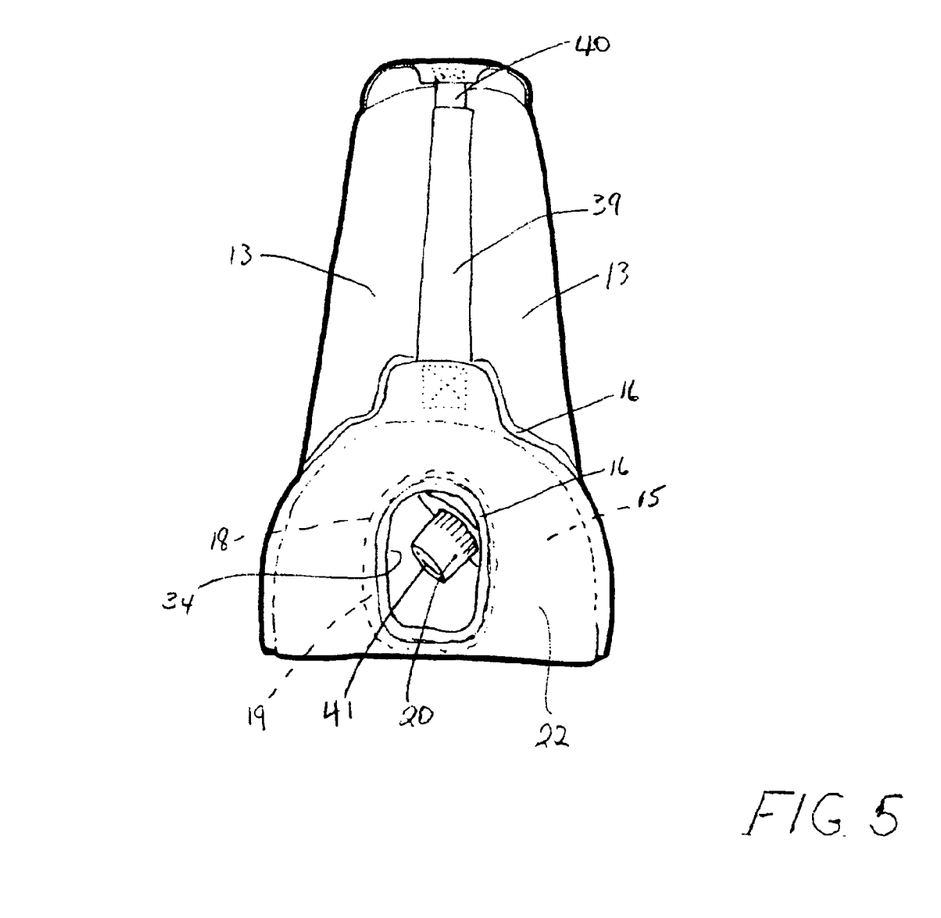
FIG. 5 is a view in perspective as shown in FIGS. 2 and 3 with the Velcro® end straps engaged to form a carrying handle.

Referring to the drawings in detail, the protective carrier consists of a flat, protective body member 11 consisting of a first external cover layer 12 of substantially continuous material which is substantially inelastic, air-tight, and, preferably water resistant and a second external cover layer 13 of substantially the same material spaced apart from the first said layer 12 thereby defining a uniformly thick cavity 14 there between. The external cover layers 12 and 13 may be fabricated of any material that meets the above characteristics such as a polyethylene-coated nylon. The cavity 14 is substantially entirely filled preferably with a unitary, continuous, and, preferably is uninterrupted pre-formed or molded foam bat 15 of substantially uniform thickness throughout defining flat, generally parallel surfaces in engagement with the cover layers 12 and 13. It is undesirable to employ loose foam tufts or stuffing material to fill the cavity 14. The bat 15 is cohesive; shape self-sustaining, preferably continuous mass. The periphery 18 of the foam bat 15 generally conforms to the shape of the sealed edges of the top and bottom cover layers, 12 and 13. The continuous, peripheral edge 18 of the foam bat is preferably flat and disposed at right angles to the plane of the surfaces of the bat 15 attached to the cover layers 12 and 13. The foam bat 15 is air-permeable or open-celled so that when the air pressure within the cavity 14 increases, the air-pressure within the mass of foam increases generally to the same degree. The foam of the bat 15 is compressively resilient and possessed of shape memory, returning to its original, undeformed shape after deforming. The foam bat 15 is substantially equally bendable in any plane from its natural flat plane when confined in the cavity 14 as shown in FIGS. 4 and 5. Preferably, the foam is preformed before assembly with flat, parallel surfaces. The first layer 12 and second layer 13 of covering material are each preferably adhered to the opposed, flat surfaces of the foam bat 15 by any suitable means such as glue, adhesive or thermal bonding.

The top or inner cover layer 12 and the bottom or outer cover layer 13 are substantially identical in peripheral shape and dimensions and when attached or bonded to each other at their respective peripheral edges 16 and 17 so as to be air-tight define the protective body member 11. The peripheral edge 18 of the foam bat 15 conforms the peripheral shape of the cover layers, 12 and 13 but dimensioned slightly smaller to leave a small open, peripheral cavity 19 between the internal surfaces of the cover layers 12 and 13 and their sealed edges 16 and 17 without significantly compressing the peripheral edge 18 of the bat 15.

An air valve 20 communicates between the exterior of the body 11 and the internal cavity 14 at the peripheral cavity 19. The valve 20 is operable to open or close manually to allow air into the cavities 14 and 19 and the foam bat 15 or permit air to be discharged there from. Preferably the valve 20 is sealed between the opposing edges of the cover layers 12 and 13.

Figure 1:
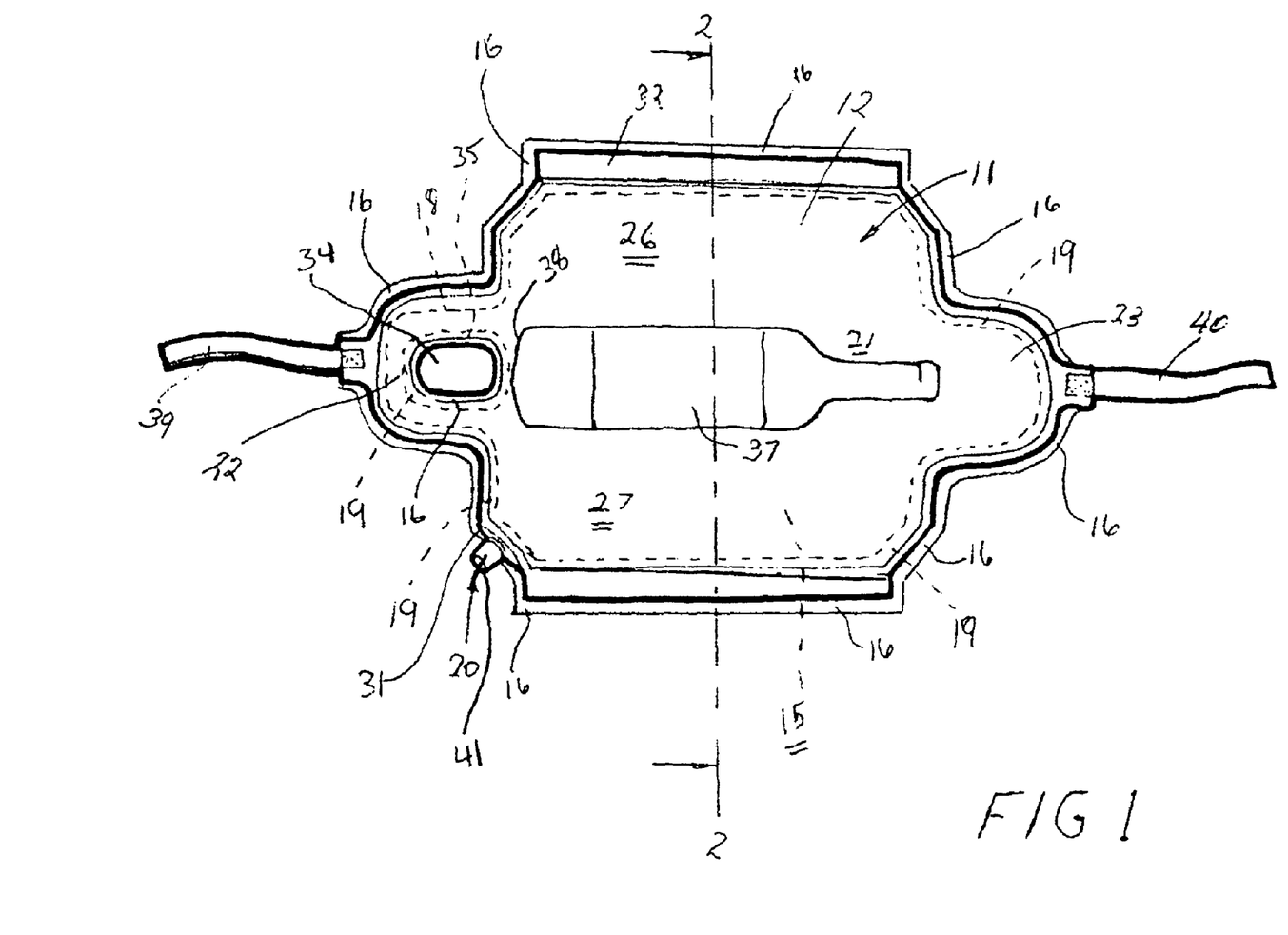
FIG. 1 is top plan view of the carrier in its normally flat configuration when unused with a bottle positioned on the inner portion thereof before wrapping. The inner or top and outer or bottom plan views are substantially identical and therefore only the top is illustrated.

The embodiment shown in the drawings is particularly suitable for protecting and transporting a bottle. In FIG. 1, the cover layers, 12 and 13, are shaped to define a generally rectangular central portion 21 continuous with opposed end panels 22 and 23 formed symmetrically on the rectangular central portion 21. It is intended that a bottle be laid on the central portion along an axis running through the center of the end panels of flaps 22 and 23. Side or wrapping panels 26 and 27 are formed continuously and integrally with the rectangular central portion 21. The sealed edges of wrapping panels 26 and 27 are tapered at 31 and 32 between their respective outermost edges 28 and 29 and the respective, opposed, end panels 22 and 23.

Velcro® strips 32 and 33 are attached to the outer edges 28 and 29 of the wrapping panels 26 and 27.

One of the end panels 22 is provided with a slot 34 continuously sealed at its inner periphery in the same manner as the peripheral edges 16 and 17 of body member 11. The foam bat 15 is also provided with a conforming slot and fills the cavity 35 in the end flap 22 in same manner as in the rest of the cavity 14 by passing through the foam bat 15. The opposing end panel 23 is identical to the end panel 22 except that it does not have a slot. Velcro® strips 39 and 40 are attached to the outermost ends of the respective end panels 22 and 23. The Velcro® strips, 39 and 40, are dimensioned sufficiently long to overlap when the end panels 22 and 23 are folded upwardly to close the ends of the case thereby covering the ends of the bottle 37. When so joined, the Velcro® strips 39, 40 define a carrying handle for the protective carrier when used as a carrying case.

The manually operable air valve 20 is mounted in the tapered edge 31 between wrapping panel 27 and the end panel 22.

Figure 2:
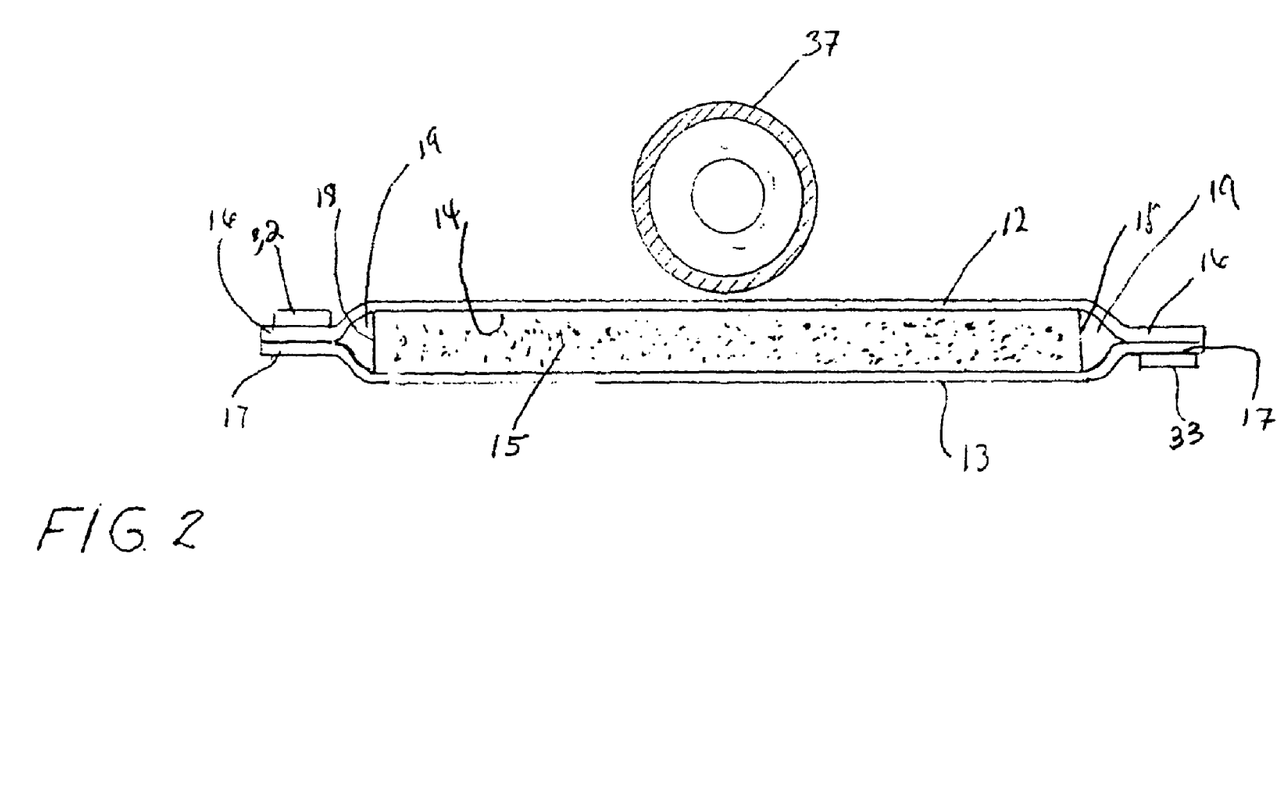
FIG. 2 is a side-elevational view of the blank taken along line 2-2 in FIG. 1.
Figure 3:
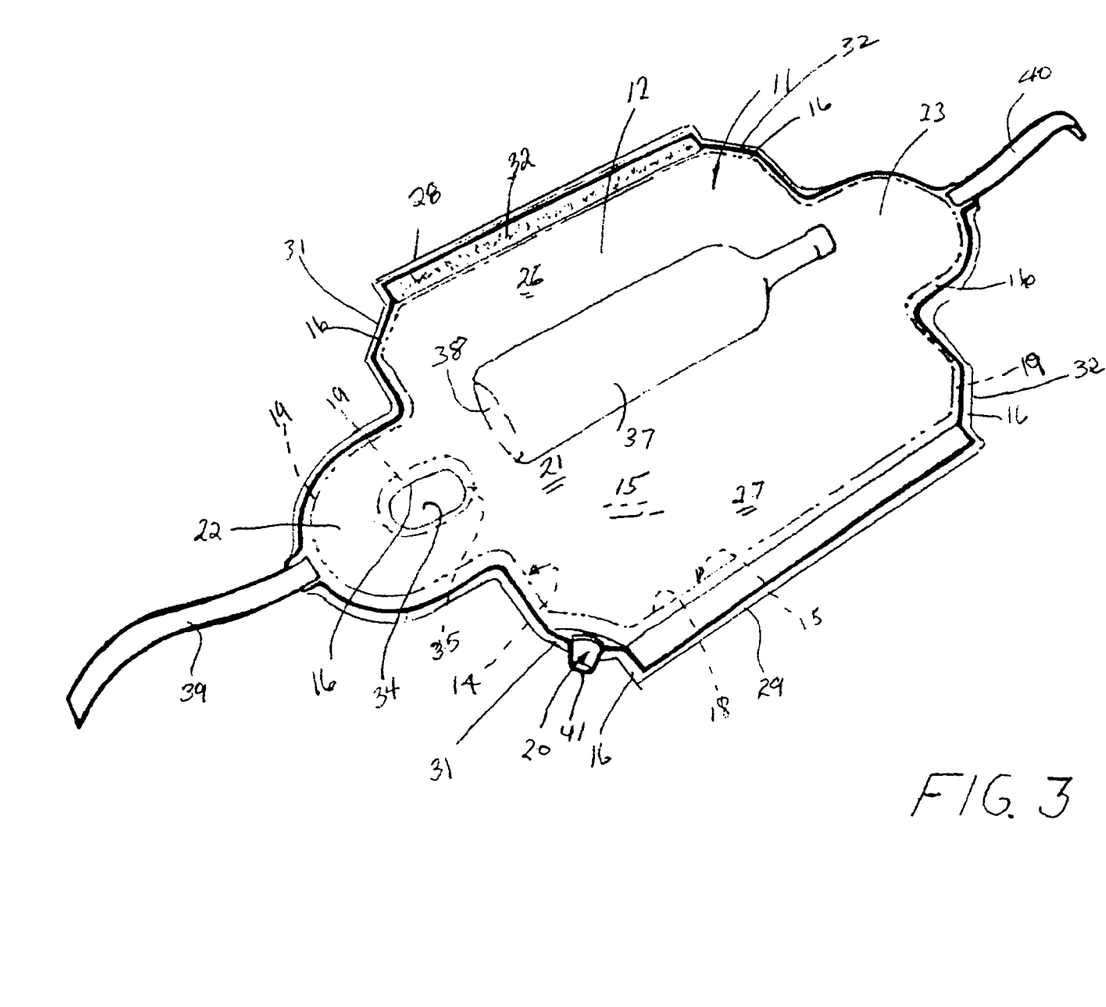
FIG. 3 is a view in perspective of the inside surface of the blank with a bottle positioned thereon before wrapping.

In use, the bottle 37 is placed on the flat body member 11 generally co-axial with the central axis running through the opposed end panels 22 and 23 as shown in FIGS. 1, 2 and 3 with the bottom 38 of the bottle 37 immediately opposed to end panel 22. The ratio of the dimensions of the central portion 21 and the wrapping panels 26 and 27 perpendicular to the long axis of the bottle should be approximately equal.

This ratio obtains irrespective of the diameter of the bottle. The total width of the body portion 11 including the wrapping panels 26 and 27 must be sufficient to define an internal, wrapped-cavity defined by inner cover layer 22 in contact with the bottle 37 at least as wide as the diameter of the bottle and to permit overlapping of the Velcro® strips 32 and 33. In practice, because it is difficult to force the internal surface 12 of the body portion 11 and wrapping panels 26 and 27 tightly into full and continuous engagement with the bottle 37 along the entire cylindrical surface thereof exclusive of the neck, the dimensions should be slightly greater than the minimum defined by the circumference of the bottle at its largest point. Moreover, the initial wrapping procedure is intended to be begun with the valve 20 open so that deforming and crushing the body 11 together with the foam bat 15 expels air from the cavities 14 and 19. When the bottle 37 or other article is completely wrapped with the side panels overlapping a secured together with the Velcro® 32 and 33 and the end panels 22 and 23 folded and the Velcro® strips 28 and 40 engaged, the normal resilience and shape memory of the foam bat 15 caused it to expand and in so doing, suck air through the open valve 20 into the cavities 14 and 19. Supplemented inflation can be achieved by forcing air through the valve 20 into the cavities 14 and 19 permeating the foam bat 15 thereby expanding the carrier into tight engagement with the bottle 37.

By way of example, in the case of an ordinary wine bottle the total length of the body member 11 parallel to the long axis of the bottle 37 is approximately 60 cm including the end panels 22 and 23. The width of the body member 11 perpendicular to the axis of the bottle is approximately 36 cm. which includes the Velcro® strips 31 and 32. The width of the end panels or flaps is approximately 13 cm and symmetrical with the axis of the body member 11 perpendicular to the long axis of the bottle 37. The length of each of the end panels 22 and 23 from the locus of engagement to the body portion 11 is approximately 11 cm. The slot 34 is substantially symmetrical with the axis of the body member 11 in the direction of orientation of the bottle 37 extending from the loci of engagement the opposing wrapping panels 26 and 27 where contiguous with the body member 11 toward the endmost portion of end panel 22. The length of the slot is about 5.50 cm and its width approximately 3.5 cm.

The slot 34 is positioned to receive and permit access to the exposed inlet end 41 of the valve 20 when the bottle 37 is fully wrapped.

After the wrapping panels 26 and 27 have been wrapped around the bottle 37 and the Velcro® strips 32 and 33 joined, the end panels or flaps 22 and 23 are folded upwardly in the direction of the Velcro® strips 32 and 33 and the Velcro® strips 39 and 40 are overlapped and joined to define a carrying handle 36.

To increase pressure of the interior walls of the carrying case engaging the bottle 37 after it has been wrapped and all the respective Velcro® strips secured, air can be blown into the valve 20 increasing the air pressure within the cavities 14 and 19. The air passes through both the mass of the foam bat 15 as well as the small continuous cavity 19 between the edge 18 of the foam bat 15 and the sealed edges of the cover layers 12 and 13. Because the foam bat 15 is adhered to the cover layers 12 and 13, air will not tend to intrude between the planar surfaces of the bat 15 and the cover layers 12 and 13. However, air will intrude into the mass of the foam bat 15 from the edges 18 thereof causing some limited but important inward expansion against the surface of the bottle 37. This is also enhanced by filling the continuous edge cavity 19 between the sealed edges of the cover layers 12 and 13 and the edge 18 of the foam bat 15. The inelasticity of the cover layers 12 and 13 causes rapid stiffening and limited expansion of the case with very little air being introduced through the valve.

The bottle 37 can be unwrapped by simply disconnecting the Velcro® strips 39 and 40 defining the handle 36 and then pulling apart the Velcro® strips 32 and 33 of the wrapping panels 26 and 27 to free the bottle 37. As the foam bat 15 is compressed during wrapping, the air in the cavities 14, 19 and the foam 15 can be forced out of the open valve 20 as needed thereby facilitating wrapping and unwrapping. When the bottle 37 is fully wrapped and all the Velcro® fasteners engaged, the air pressure within the cavities 14 and 19 and the foam 15 will become equal to the ambient air pressure when the valve 20 is open and air is drawn into the cavity to fill the interstitial space within the body of the foam 15 and cavity 19. Air can then be manually forced through the exposed inlet 41 end of the valve 20 to increase the internal air pressure and the valve 20 quickly closed to trap the greater than ambient air pressure inside of the cavities 14 and 19 and the foam 15. Conveniently, the valve 20 can be operated manually by rotating an external ring even when in the mouth of a person blowing into the valve 20. The internal construction of the valve 20 is conventional.

Figure 6:
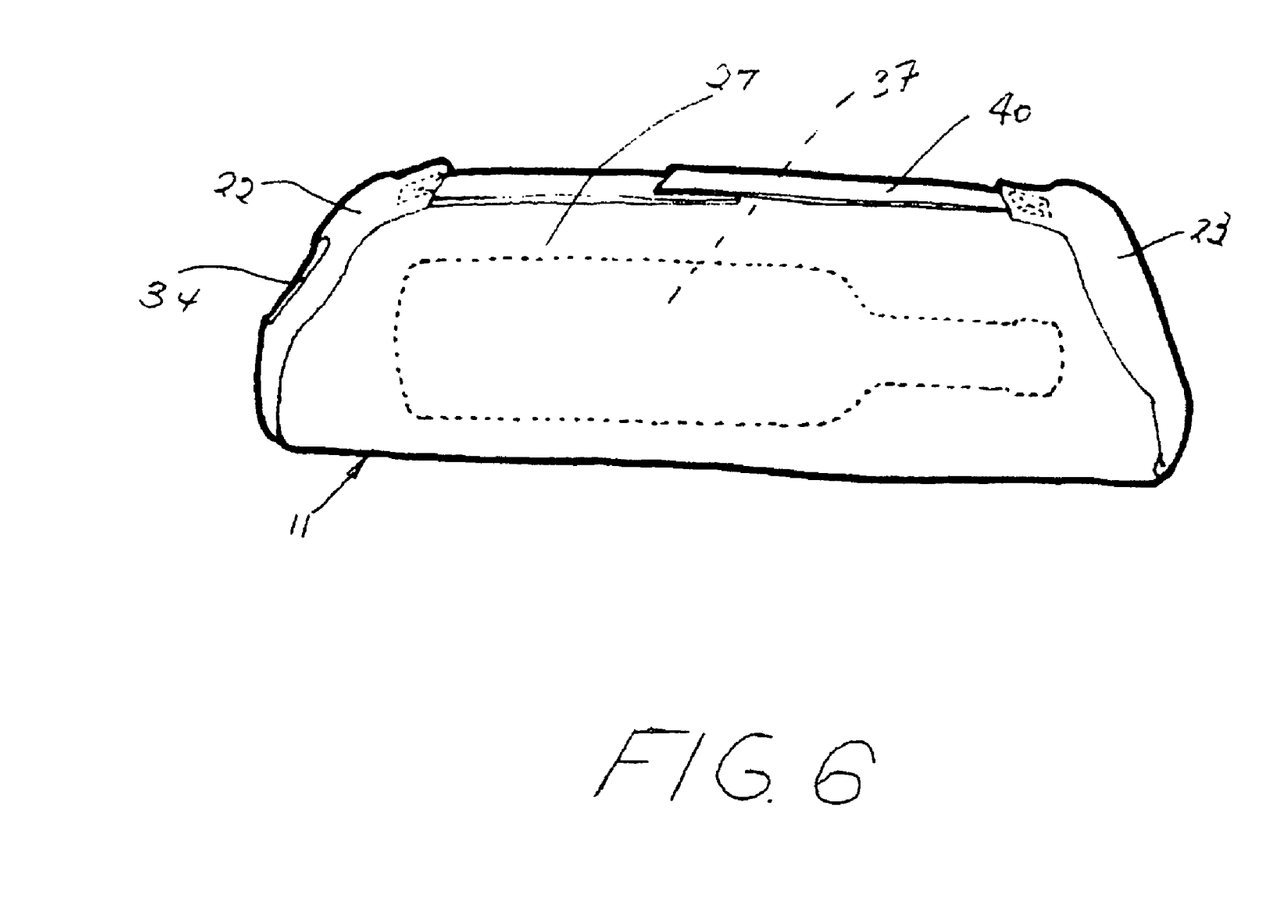
FIG. 6 is a side-elevational view of the blank fully wrapped around a bottle with the bottle shown in broken lines and the end straps engaged to form a carrying handle.

As shown in FIGS. 5 and 6, when the bottle 37 is completely wrapped, the air valve 20 nestles within the slot 34 and its inlet end 41 is accessible to manual operation as well as the introduction of air by mouth or its release by manually operating the valve. Nevertheless, the valve 20 is not exposed beyond the carrying case in such a manner as to be struck or snagged by nearby objects.

After use, the body 11 can be stored in a flat configuration as shown in FIG. 1. The valve 20 can be opened the body member 11 compressed including by rolling to express internally contained air from the valve 20 and the valve then closed to maintain the body member 11 as thin as possible. However, because the foam bat 15 has shape memory and is normally flat, the entire body 11 will lie flat.

Because at least the outer cover layer is strong and inelastic, the body 11 will not bulge outwardly even when the ambient air pressure is substantially less than the internal air pressure within the cavities and foam. Thus, there is virtually no danger of explosive rupturing of the outer layers even if the carrying case is put in a non-pressurized cargo hold or other compartment in an aircraft or transported from sea level to a high altitude.

Although current security regulations may prohibit carrying liquids more than three ounces on commercial aircraft, the protective carrier may be employed to carry an empty container such as a fragile carafe.

We claim:

1. A unitary, reusable, deformable protective carrier comprising:
   a) a protective body defined by a generally normally flat, hollow peripherally sealed case defining two flat surfaces and formed from spaced-apart substantially inelastic, un-stretchable, airtight cover layers peripherally sealed at their edges defining an airtight unitary, undivided cavity, the protective body being distortable to entirely surround an article and having:
      a generally rectangular central portion having one dimension greater than the other,
      a pair of generally opposed side portions formed integrally on opposite sides of the longer dimension of the central portion and generally equal in length to the longer dimension of the central portion and defining opposed side edges of the protective body, wherein the distance between the edge of each side portion and the central portion is generally the same as the shorter dimension of the central portion, a pair of end portions formed integrally on each of the sides of the shorter dimension of the central portion, the dimension of the end portions joining the central portion being generally equal to the shorter dimension of the central portion, b) a resilient, one-piece, self-supporting, open-celled, flat foam bat in the cavity having flat top and bottom faces and a continuous peripheral edge conforming to the-shape of the cavity, the edge of the bat being free from sealing to the case at its peripherally-sealed edges thereby defining continuous, uninterrupted, interior, means for air passage at the edge of the bat, the bat having:

a normally uncompressed and unexpanded thickness between its top and bottom faces under atmospheric pressure and being compressible between its top and bottom faces under force external to the case and expandable between said top and bottom faces but peripherally non-expandable in response to varying gas pressure within and surrounding edges of the bat, shape memory to resiliently return to its normally uncompressed and unexpanded thickness when its internal gas pressure is substantially equal to the ambient atmospheric pressure on the outside of the case, c) means on the protective body for detachably securing portions thereof to each other when an article is contained therewithin, d) operative valve means connected between the said means for air passage and the exterior of the body for controllably increasing and decreasing air pressure inside of the cavity, wherein said operative valve means is positioned on one edge of one of the side portions intermediate one of the end portions and the central portion and communicating between the peripheral edge of the bat within the case and the exterior of the case.

2. A unitary, reusable, deformable protective carrier comprising the structure in accordance with claim 1, in which
a) the end portion proximal to the valve means is provided with an opening extending through the opposed flat surfaces of the case and the top and bottom faces of the bat to define an interior, peripherally-sealed opening-edge, the foam bat in the case conforming to the opening in the said end portion,
b) the valve means nesting in the opening when the side portion having the valve means and the end portion having the opening are folded over the central portion.

3. A unitary, reusable, deformable protective carrier comprising the structure in accordance with claim 1, and
a) separate strap means secured to each of the said end portions, the separate strap means overlapping when the end portions are folded over the central portion, and
b) means on each of the separate strap means distal from the said end portions for detachably securing the strap means together.

4. A unitary, reusable, deformable protective carrier comprising the structure in accordance with claim 3, in which
a) each of the side portions has an edge distal to the central portion,
b) inter-engaging attachments means on each said edge of the respective side portions for attaching and detaching the side portions to and from each other.

5. A unitary, reusable, deformable protective carrier comprising the structure in accordance with claim 1, in which
a) the respective side portions are dimensioned to overlap each other when folded over the central portion, and
b) the respective end portions are dimensioned sufficiently short so as not to overlap each other when folded over the central portion, and
c) the central portion, side portions and end portions defining a cavity for an article when the respective side portions and end portions are folded over the central portion, and
d) the end portion proximal to the valve means is provided with an opening extending through the opposed flat surfaces of the case and defining an interior, peripherally-sealed opening-edge, the foam bat in the case conforming to the opening in the said end portion,
e) the valve means nesting in the opening when the side portion having the valve means and the end portion having the opening are folded over the central portion, and
f) separate strap means secured to each of the said end portions, the separate strap means overlapping when the end portions are folded over the central portion, and
g) means on each of the separate strap means distal from the said end portions for detachably securing the strap means together,
h) the respective side portions are dimensioned to overlap each other when folded over the central portion, and
i) the respective end portions are dimensioned sufficiently short so as not to overlap each other when folded over the central portion, and
j) each of the side portions has an edge distal to the central portion,
k) operatively engageable attachment means on each said edge of the respective side portions for attaching and detaching the side portions to and from each other.

6. A unitary, reusable, deformable protective carrier comprising the structure in accordance with claim 1, in which
a) the top and bottom faces of the bat are sealed to the respective cover layers to substantially preclude air introduced through the valve means from intruding between the cover layers and the bat.

7. A unitary, reusable, deformable protective carrier comprising the structure in accordance with claim 6, in which
a) the respective, top and bottom faces of the bat are sealed against air intrusion over substantially their entire surface to preclude air introduced through the valve means from intruding between the cover layers and the bat.

\* \* \* \* \*